(12) United States Patent
Brunswig et al.

(10) Patent No.: US 8,387,030 B2
(45) Date of Patent: Feb. 26, 2013

(54) SERVICE ADAPTATION DEFINITION LANGUAGE

(75) Inventors: Frank Brunswig, Heidelberg (DE); Thomas Fiedler, Pfinztal (DE); Oswald Gschnitzer, Heidelberg (DE); Marcel Hermanns, Heidelberg (DE); Markus Viol, Walldorf (DE); Jens Weiler, Weingarten (DE); Gerhard Wenzel, Wiesloch (DE)

(73) Assignee: SAP AG, Waldorf (DE)

( * ) Notice: Subject to any disclaimer, the term of this patent is extended or adjusted under 35 U.S.C. 154(b) by 670 days.

(21) Appl. No.: 12/648,216

(22) Filed: Dec. 28, 2009

(65) Prior Publication Data

US 2011/0161942 A1 Jun. 30, 2011

(51) Int. Cl.
*G06F 9/45* (2006.01)
*G06F 9/44* (2006.01)
(52) U.S. Cl. .................. 717/143; 717/140; 717/148
(58) Field of Classification Search .......... 717/140–148; 709/203–204
See application file for complete search history.

(56) References Cited

U.S. PATENT DOCUMENTS

| | | | | |
|---|---|---|---|---|
| 5,182,806 A | * | 1/1993 | McKeeman et al. | 717/145 |
| 5,287,490 A | * | 2/1994 | Sites | 717/142 |
| 6,102,969 A | * | 8/2000 | Christianson et al. | 717/146 |
| 6,687,734 B1 | * | 2/2004 | Sellink et al. | 709/203 |
| 7,117,488 B1 | * | 10/2006 | Franz et al. | 717/144 |
| 7,219,339 B1 | * | 5/2007 | Goyal et al. | 717/143 |
| 7,290,252 B2 | * | 10/2007 | Diedrich et al. | 717/145 |
| 7,389,498 B2 | * | 6/2008 | Meijer et al. | 717/141 |
| 7,426,721 B1 | * | 9/2008 | Saulpaugh et al. | 717/144 |
| 8,087,009 B1 | * | 12/2011 | Cornish | 717/143 |
| 8,136,102 B2 | * | 3/2012 | Papakipos et al. | 717/140 |
| 8,150,862 B2 | * | 4/2012 | Bhattacharya et al. | 707/755 |

OTHER PUBLICATIONS

Hoschek, "The web service discovery architecture", IEEE, pp. 1-15, 2002.*
Grossmann et al, "A conceptual modeling approach for web service composition supporting service re-configuration", ACM APCCM, pp. 43-52, 2010.*
Rohl et al, "Composing simulation model using interface definition based on web service description", IEEE, pp. 815-822, 2007.*
Xu et al, "A basic model for components implementation of software architecture", ACM pp. 1-11, 2004.*

* cited by examiner

*Primary Examiner* — Anil Khatri
(74) *Attorney, Agent, or Firm* — Mintz Levin Cohn Ferris Glovsky and Popeo, P.C.

(57) ABSTRACT

A back-end service adaptation system provides access to normalized data in a data repository for a consumer runtime environment sending a query request for denormalized data. The back-end service adaptation system can include a data access service layer, a parser layer, and a back-end service adaptation runtime layer. The consumer runtime can use a service adaptation definition language (SADL), and the parser and data access service can be configured to convert and translate the SADL request for the back-end service adaptation runtime layer.

17 Claims, 10 Drawing Sheets

```
<sadi:definition xmlns:sadi="http://sap.com/sap/nw1sadi"
    xmlns:esf="http://sap.com/xi/ESF"
    xmlns:cdt="http://sap.com/xi/BASIS/Global"
    xmlns:ass="http://sap.com/sap/nw1sadi/association"
    uuid ="550e8400-e29b-11d4-a716-446655440001"
    date = "11.11.2008" time = "18:00:00">

<sadi:dataSource type="BusinessObjectNode" binding="esf.SALES_ORDER/ass.ROOT" name = "S1" />
    <sadi:resultSet>
        <sadi:structure name="SALES_ORDER_TYPE" dataSource = "S1" >
            <sadi:attribute       name = "ID"              binding ="ID" />
            <sadi:attribute       name = "AMOUNT"          binding = "TOTAL_AMOUNT" />

<sadi:structure       name ="ITEM_TYPE"        binding = "ass:ITEM" >
                <sadi:attribute   name= "ID"               binding = "ID"/>
                <sadi:attribute   name= "PRODUCT_NAME"     binding = "PRODUCT_NAME" />
            </sadi:structure>

</sadi:resultSet>
</sadi:definition>
```

FIG. 6

```
<sadl:definition xmlns:sadl="http://sap.com/sap.nw1/sadl"
    xmlns:esf="http://sap.com/xi/ESF"
    xmlns:cdt="http://sap.com/xi/BASIS/Global"
    xmlns:ass="http://sap.com/sap.nw1/sadl/association"
    xmlns:clb="http://sap.com/sap.nw1/sadl/callback"
    xmlns="http://sap.com/sap.nw1/sadl/attribute"
    uuid="550e8400-e29b-11d4-a716-446655440002"
    date="11.11.2008" time="10:00:00">

<sadl:dataSource type="BusinessObjectNode" binding="esf:SALES_ORDER/ass:ROOT" name="S1" />

<sadl:callback    type="ABAP" classname="CL_BSA_SALES_ORDER_CB"
                  targetBO="bo:SALES_ORDER" targetNode="ITEM" name="C1" >

<sadl:resultSet >
    <sadl:structure name="SALES_ORDER_TYPE" dataSource="S1" >
        <sadl:attribute    name="ID"                    binding="ID" />
        <sadl:attribute    name="CREATION_DATE"         binding="ADMINISTRATIVE_DATA/CREATION_DATE" />
        <sadl:attribute    name="TOTAL_GROSS_AMOUNT"    binding="TOTAL_GROSS_AMOUNT" />
        <sadl:attribute    name="CALCULATED_AMOUNT"     type="cdt:AMOUNT" />
        <sadl:attribute    name="SELLER_COMPANY_NAME"   binding="ass:SELLER_BY_ID/COMPANY_NAME" />
        <sadl:attribute    name="SELLER_POSTAL_CODE"    binding="ass:SELLER_BY_ID/ass:ADDRESS[TYPE='02']/POSTAL_CODE" />
    <sadl:structure name="ITEM_TYPE" binding="clb:C1">
        <sadl:attribute name="ID" binding="ID" />
    </sadl:structure>
</sadl:resultSet>

</sadl:definition>
```

FIG. 7

```
<sadl:definition xmlns:sadl="http://sap.com/sap.nw1.sadl"
    xmlns:esf="http://sap.com/xi/ESF"
    xmlns:cdt="http://sap.com/xi/BASIS/Global"
    xmlns:ass="http://sap.com/sap.nw1.sadl/association"
    xmlns:fct="http://sap.com/sap.nw1.sadl/function"
    uuid ="550e8400-e29b-11d4-a716-446655440003"
    date = "11.11.2009" time = "16:00:00">

<sadl:dataSource type="BusinessObjectNode" binding="es!SALES_ORDER/ass:ROOT" name="S1" />

<sadl:resultSet >
  <sadl:structure name="SALES_ORDER_TYPE" dataSource="S1" >
    <sadl:attribute    name="ID"                        binding="ID" />
    <sadl:attribute    name="CREATION_DATE"             binding="ADMINISTRATIVE_DATA/CREATION_DATE" />
    <sadl:attribute    name="TOTAL_GROSS_AMOUNT"        binding="TOTAL_GROSS_AMOUNT" />
    <sadl:attribute    name="CALCULATED_AMOUNT"         type="cdt:AMOUNT" />
    <sadl:attribute    name="SELLER_COMPANY_NAME"       binding="ass:SELLER_BY_ID/COMPANY_NAME" />
    <sadl:attribute    name="SELLER_POSTAL_CODE"
                       binding="ass:SELLER_BY_ID/ass:ADDRESS[TYPE='02']/POSTAL_CODE" />
    <sadl:attribute    name="SELLER_POSTAL_DESCRIPTION"
                       binding="fct:CODE_NAME(ass:SELLER_BY_ID/ass:ADDRESS[TYPE='02']/POSTAL_CODE)" />
  </sadl:resultSet>
</sadl:definition>
```

FIG. 8

```
<sadl:definition xmlns:sadl="http://sap.com/sap.nw.f.sadl"
    xmlns:est="http://sap.com/xiESF"
    xmlns:cdt="http://sap.com/xifIASTSAGlobal"
    xmlns:ass="http://sap.com/sap.nw.f.sadl/association"
    xmlns="http://sap.com/sap.nw.f.sadl/attribute"
    uuid="550e8400-e29b-11d4-a716-446655440003"
    date="11.11.2008" time="18:00:00">

<sadl:dataSource type="BusinessObjectNode" binding="est:SALES_ORDER/ass:ROOT" name="S1"/>

<sadl:resultSet>
    <sadl:structure name="SALES_ORDER_TYPE" dataSource="S1">
      <sadl:attribute name="ID"                     binding="ID"/>
      <sadl:attribute name="CREATION_DATE"          binding="ADMINISTRATIVE_DATA/CREATION_DATE"/>
      <sadl:attribute name="TOTAL_GROSS_AMOUNT"     binding="TOTAL_GROSS_AMOUNT"/>
      <sadl:attribute name="CALCULATED_AMOUNT"      type="cdt:AMOUNT"/>
      <sadl:attribute name="SELLER_COMPANY_NAME"    binding="ass:SELLER_BY_ID/COMPANY_NAME"/>
      <sadl:attribute name="SELLER_POSTAL_CODE"
          binding="ass:SELLER_BY_ID/ass:ADDRESS/TYPE=02)/POSTAL_CODE"/>
      <sadl:attribute name="DESCRIPTION" binding="ass:DESCRIPTION/LANGUAGE_CODE=SY-LANGU)/DESCRIPTION"/>
    </sadl:structure>
  </sadl:resultSet>
</sadl:definition>
```

*FIG. 9*

```
<sadi:definition xmlns:sadi="http://sap.com/sap.nw.f.sadi"
    xmlns:esf="http://sap.com/xi/ESF"
    xmlns:cdt="http://sap.com/xi/BASIS/Global"
    xmlns:ass="http://sap.com/sep.nw.f.sadi/association"
    xmlns="http://sap.com/sep.nw.f.sadi/attribute"
    uuid ="550e8400-e29b-11d4-a716-446655440001"
    date = "11.11.2008" time = "18:00:00">

<sadi:dataSource type="BusinessObjectNode" binding="esf:SALES_ORDER#ass:ROOT" name = "S1" />
<sadi:resultSet>
    <sadi:structure name="SALES_ORDER_TYPE" dataSource = "S1" >
        <sadi:attribute        name = "ID"              binding = "ID" />
        <sadi:attribute        name = "AMOUNT"          binding = "TOTAL_AMOUNT" />

<sadi:structure        name ="ITEM_TYPE"                             binding = "ass:ITEM" >
            <sadi:attribute    name= "ID"                                    binding = "ID" />
            <sadi:attribute    name= "PRODUCT_NAME"                          binding = "PRODUCT_NAME" isSearchable = "TRUE" />
        </sadi:structure>
    </sadi:structure>
</sadi:resultSet>
</sadi:definition>
```

*FIG. 10*

SERVICE ADAPTATION DEFINITION LANGUAGE

TECHNICAL FIELD

The subject matter described herein relates to data service adaptations between a provider layer and a consumer layer such as a consumer runtime environment.

BACKGROUND

Business objects or other data objects in an object-oriented computer program can represent the entities in a business domain that the object-oriented computer program is designed to support. Business objects are also sometimes referred to as domain objects. A domain model can represent the set of domain objects and the relationships between them. A business object can encapsulate all or at least some of the data and business behavior associated with the entity that it represents. In some applications for example an enterprise resource application such as those available from SAP AG (Walldorf, Germany), a business object can be modeled and implemented in a normalized manner to optimize service provisioning. However, normalized business objects can be less convenient for certain consumer needs which can, in some examples, be more efficiently satisfied using denormalized views. For example, joined data of other business objects for use in a user interface, a form, an agent, a data analytic routine or module, or the like may be more efficiently accessed using one or more denormalized views. A service adaptation can provide a mapping facility to fill the gap between the provider layer, for example one or more repositories storing data and data objects, and a consumer layer that accesses the data and data objects.

Frontend service adaptation allows for the combination of fields from different business object nodes so that a resulting adapted business object node can be used for displaying required business data in a user interface. With frontend service adaptation, an adapted business object node is configured to contain fields from different business object nodes along an association path. Such an arrangement can result in a large amount of meta-data residing and being processed by a frontend server. In addition, during runtime, all data on an associated path is transferred to the frontend server. Moreover, many association paths may need to be evaluated on the frontend in order to access required business object fields. All of such requirements relating to frontend service adaptation can negatively affect performance, network data volume, memory consumption, and response time for the corresponding user interfaces.

SUMMARY

In one aspect, a computer-implemented method includes receiving, at a service adaptation definition language-specific data access service of a back-end service adaptation system that is implemented on at least one processor, a query request in a service adaptation definition language (SADL) from a runtime application executing in a SADL consumer runtime environment on a client machine. The query request requests runtime access to a runtime instance of a data object via the consumer runtime environment. The data object includes application data that are stored in an application repository. The service adaptation definition language-specific data access service creates a denormalized data object. An interpreter of the back-end service adaptation system executes a runtime load compiled from a SADL source code provided by the SADL consumer runtime environment that includes an execution plan for retrieving and converting the normalized data. Executing the runtime load includes retrieving the application data from the application repository and converting the application data for inclusion in the denormalized data object according to the execution plan. The denormalized data object containing the converted application data is delivered to the SADL consumer runtime environment.

In optional variations, one or more of the following features can be included. The application data can be either normalized or denormalized. The interpreter can call at least one of a search plug-in and a local client proxy according to the execution plan of the runtime load. The search plug-in and/or the local client proxy access the application data repository to retrieve the application data. A SADL parser of the back-end service adaptation system can create, from the source code in the service adaptation definition language, a compiler format of adaptation meta-data necessary to provide runtime access to the application data. A compiler of the back-end service adaptation system can generate, using the compiler format, the runtime load. The generating can include calling, by the compiler, at least one search plug-in to determine the execution plan to provide optimal performance in response to the query request. The runtime load can be stored by the compiler in a load cache, and the interpreter can access the runtime load from the load cache via the compiler.

An SADL parser of the backend service adaptation system can verify a proper syntax of the query request. A load availability check can be performed to determine whether the runtime load has been previously generated and is up to date. If the load availability check determines that the runtime load has been not previously generated or is not up to date, the method can further include receiving the SADL source code from the SADL consumer runtime environment, and calling the SADL parser to trigger generation of the runtime load from the SADL source code by a compiler of the back-end service adaptation system. The SADL parser can translate the SADL source code into a language-independent format usable by the compiler.

Articles are also described that comprise a tangibly embodied machine-readable medium that stores instructions. When executed by at least one processor or machine (for example a programmable computer), these instructions cause the at least one processor to perform operations such as those described herein. Similarly, computer systems are also described that may include at least one processor and at least one memory coupled to the processor. The memory may include a program or programs that cause the processor to perform at least one of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 is an example of source code that can be used with an implementation;

FIG. 7 is an example of source code that can be used with an implementation;

FIG. 8 is an example of source code that can be used with an implementation;

FIG. 9 is an example of source code that can be used with an implementation; and FIG. 10 is an example of source code that can be used with an implementation.

When practical, similar reference numbers denote similar structures, features, or elements.

DETAILED DESCRIPTION

Figure 1:
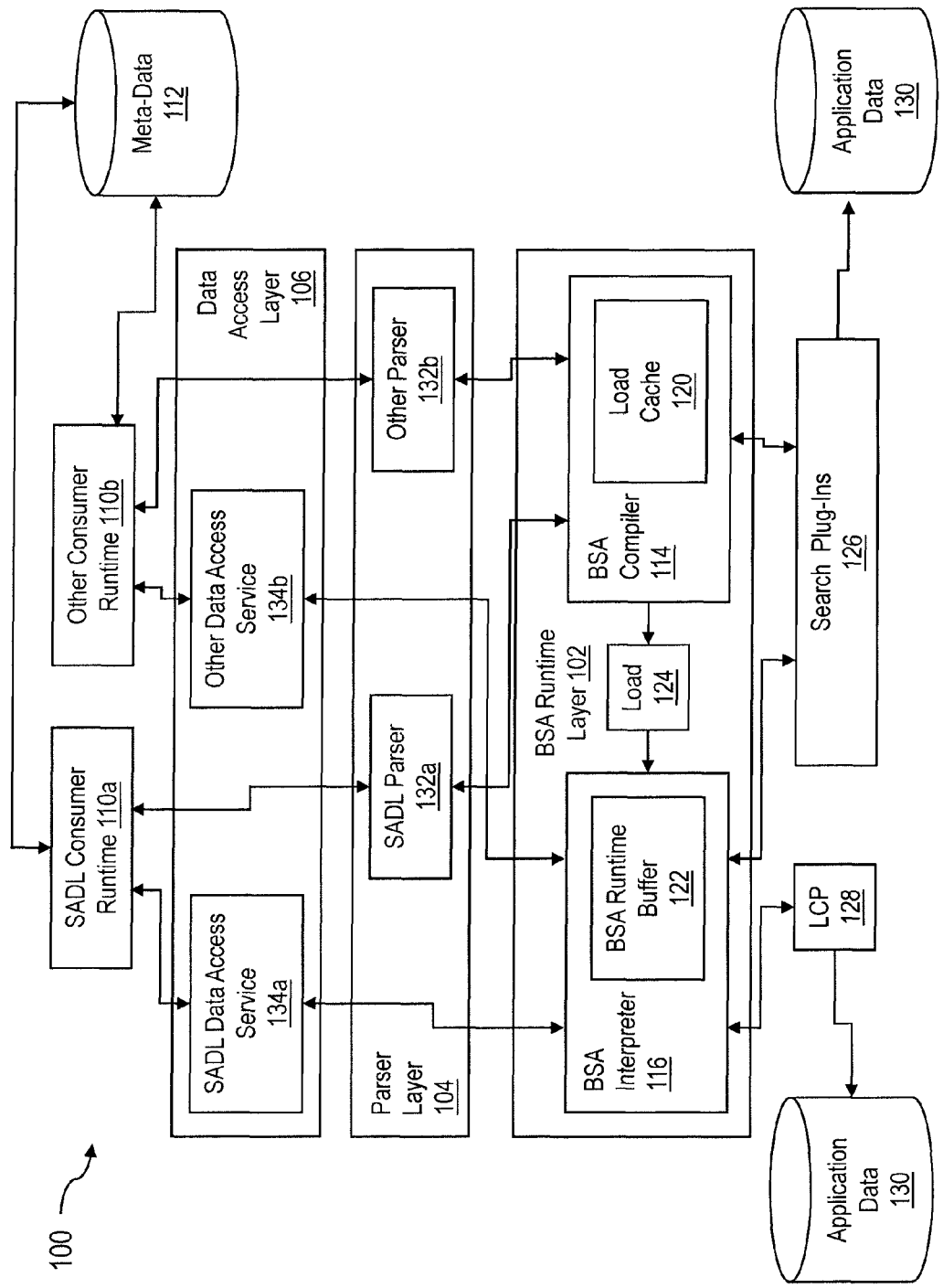
FIG. 1 is a block diagram illustrating a system.

By shifting service adaptation to the backend, performance, network data volume, memory consumption, and response times can all be improved. These improvements are based, in part, on a reduction of meta-data on the frontend, data transferred to the frontend, and fewer roundtrips between the frontend and the backend. An example of backend service adaptation is described in co-pending and co-owned U.S. patent application Ser. No. 12/246,247, the disclosure of which is incorporated herein by reference in its entirety.

A consumer runtime environment provided by a different vendor or that is otherwise not native to one or more data sources in a data provider layer may not be directly compatible with a business or data object meta-model used by the data provider layer. In currently available solutions, a support mechanism for integrating otherwise incompatible consumer runtime environments with a data provider layer is typically based on open schema standard like Extensible Mark-up Language (XML) Schema Definition (XSD) or open protocols like Web Services. For example, only data-oriented mapping facilities might be provided from proprietary data types, for example Advanced Business Application Programming (ABAP, available from SAP AG, Walldorf, Germany), Java data types, or the like to business object node attributes.

According to one or more implementations of the current subject matter, more full-featured access to such data types via a specific language, such as for example Business Query Language (BQL), Service Adaptation Definition Language (SADL), or the like, can be supported by a data access service (DAS) layer of a service adaptation system. In some variations, data can be stored in service data objects (SDOs), which can be internally-based on an ABAP table format. Data access to these SDOs can be provided by one or more available application programming interfaces (API) to facilitate good performance, convenience of data access, and a broader range of data access tools and features to different data users via multiple, possibly incompatible, consumer runtime environments that are not native to the data format used in the data provider layer.

Different languages can be provided for defining queries and joining data using a language-parser-compiler-interpreter approach. An architecture for such an approach can include a single runtime that supports all available data mapping features and allows runtime APIs to access these available data mapping features. The feature set can be separated into an interpreter and compiler feature set.

The compiler feature set can be language independent and can provide APIs for generating a back-end service adaptation runtime load which can be used by an interpreter. The load can be generated transiently just for one session or it can be cached server-wide (shared memory) or system-wide (database). In addition, the compiler can provide a validation API to validate a concrete abstract syntax tree (specific query and/or mapping) against the content of the runtime repository. The validation API can provide design-time support for a "check button" feature that allows real time diagnostics to be executed.

The runtime interpreter can also be language independent and can execute one or more of a specific query, a specific mapping, or the like. The runtime interpreter can also provide additional facilities such as in-memory aggregation if this is not available by the runtime execution plug-ins, such as for example the Fast Search Infrastructure (FSI) or Object-Relational mapping (O-R mapping).

One or more languages or data formats can be supported via an abstract syntax tree by a service adaptation layer according to implementations of the current subject matter. For example, the Business Query Language (BQL) can be supported to provide an easy to use and quick to learn beginner's language that is similar to Structured Query Language (SQL). A service adaptation definition language (SADL) can also be provided as an Extensible Markup Language (XML) that provides broad feature set support, repository integration, flexibility facilities, and the like. For each supported language, a different parser can be provided to handle creation of an abstract syntax tree for a service adaptation compiler that provides syntactical checks for the specific language. A semantic check of the abstract syntax tree can be provided by the service adaptation compiler in a language independent way.

A query called on a business object node and originating, for example, at a user interface of a consumer runtime environment on one or more client machines can act as a starting point for a service adaptation process. In addition, data of other intra-business object or cross-business object nodes can be joined by a service adaptation and the result displayed in a user interface. For business intelligence reporting, a query can be created based on business object node attributes. Such a query is typically not modeled in the business object. Instead, so-called searchable fields can be marked in the business object nodes so that a query builder can determine which fields can be used in the search conditions and which fields can only be joined. Searchable fields are fields that can be accessed very quickly because they are available and/or replicated, for example cached in memory, in a search engine. One example of a search engine is the TREX search engine available from (SAP AG, Walldorf, Germany). Other fields can be inserted, but typically not conveniently searched, if they are calculated at runtime and therefore have no persistence, and/or if they are not replicated in a search engine (because of the performance demands that can arise from using a standard database index for a search if no search engine index is available). To improve performance, additional reporting features, such as for example aggregation, other query conditions that can use Boolean expressions or SQL where clauses (for example), or free defined queries can be supported by the underlying query engine close to the persistency. For a case in which a spreadsheet is used for reporting, a key user and/or an end user may need to customize the report in an ad-hoc scenario by joining additional business object node attributes to a report or by using additional business object node attributes in the search and aggregation conditions. Some user interfaces can be based on enhanced controller objects (ECO) or other types of technical business objects. Mapping between node attributes of such technical business objects and mapped business object node attributes can be supported by business object to business object mapping. The entry point for a user interface in this example can be a query of a business object node.

In an implementation, a system 100 as shown in FIG. 1 can include one or more processors, programmable machines, computers, or the like that execute one or more software modules or other machine readable instructions that implement various functionality consistent with one or more aspects or features of the current subject matter. As shown in FIG. 1, the system includes a service adaptation runtime layer 102, a parser layer 104, and a data access layer 106. The service adaptation runtime layer can be a back-end service adaptation runtime layer 102 as shown in FIG. 1.

A consumer runtime environment, which can be a SADL consumer runtime environment 110a or an other consumer runtime environment 110b, can be implemented on the one or more processors, or alternatively on one or more client machines in communication with the one or more processors over a computer network. The computer network can be a local or wide area network, an organization's intranet, the Internet, or the like. The consumer runtime environment 110a, 110b can access a repository 112, which can be a meta-data repository, either locally or over a network. In some cases, the consumer runtime environment 110a, 110b can be part of a front-end (e.g., client-side) application and the provider business objects can be part of a back-end (e.g., server-side) system.

The service adaptation runtime layer 102 can, in some implementations, for example to improve performance, be executed as a back-end service adaptation layer 102 as shown FIG. 1. In other implementations, the service adaptation layer 102 can also be defined in other design time environments than those provided by the back-end service adaptation system 100. A back-end service adaptation approach can include at least one language in a format that is transportable between different systems and that is provided by the back-end service adaptation layer 102. A service adaptation definition language (SADL) can be aware of code exits for calculated fields and can be seamlessly integrated in the flexibility facilities of the system. Other languages, such as for example BQL, and the like can also be supported. Other languages can be easily supported according to the current subject matter without modifying the compiler 114 or the interpreter 116, both of which are language-independent. A new language-specific parser 132 and language-specific data access server (DAS) 134 can be added to the parser layer 104 and the data access layer 106, respectively, so that the back-end service adaptation system 100 can be supported in addition to SADL and/or BQL.

The BSA compiler 114 can provide an interface to the parser layer 104 where service adaptation meta-data can be passed. In an implementation, the BSA compiler 114 defines a parser independent format which can be compiled in an optimized format for the consumer runtime environment 110. A runtime load 124 can be cached in the load cache 120 or other shared memory to provide access to the runtime load 124 at runtime. The BSA compiler 114 can provide an internal channel for the BSA interpreter 116 to retrieve the runtime load 124 load cache 120. The BSA compiler 114 can store service adaptation meta-data in the repository 112 or, alternatively, in another repository (not shown in FIG. 1), to recompile the runtime load 124 when it is needed. Identification of the runtime load 124 can include an Universal Unique Identifier (UUID) as part of input meta-data. A consumer runtime environment 110a or 110b can provide a source code document, for example via a mapping provider for a SADL consumer runtime environment 110a, if the availability check fails. In implementations where the back-end service adaptation system 100 does not include a repository in which to store the source code document, the consumer runtime environment 110a or 110b can store the source code document in the repository 112 or some other repository. The BSA compiler 114 can access the meta-data repository 112 where business object meta-data can be stored, to get necessary information about the business objects being mapped in the service adaptation language (for example SADL, BQL, or another language).

The BSA compiler 114, which can be service adaptation language independent, can also validate the adaptation meta-data to check whether the business objects within the back-end service adaptation are used correctly. This validation can especially be used in design time tools for syntax checking. During compilation, the BSA compiler 114 can determine the best strategy to fulfill the user request in the most efficient way. This can be advantageous for a search scenario where several optimizations are possible during runtime. In some implementations, one or more search plug-ins 126 can be called by the BSA compiler 114 and/or the BSA interpreter 116 to find a best search strategy. Alternatively, a local client proxy (LCP) 128 can be called to provide input to the best search strategy. Such a strategy can also be stored as part of the runtime load 124. The LCP 128 and the search plug-ins 126 can each access one or more application data repositories 130 from which the consumer runtime 110a or 110b requests data access.

Examples of search plug-ins 126 can include, but are not limited to FSI and Business Object Processing Framework (BOPF), which is a generic framework for persistency and business logic of application data. A FSI plug-in can analyze whether there is a FSI view that can be used for executing the user request or creating a new FSI view. A BOPF plug-in can analyze database tables, for example in the repository 112 where the data for the business subjects are stored. The plug-ins 126 can be registered in a registry and can be called via an interface so that the plug-ins 126 can be implemented independently from the back-end service adaptation runtime layer 106.

As shown in FIG. 1, the parser layer 104 can include one or more of a SADL parser 132a and a BQL parser 132b. As noted above, other languages can also be supported. A language-specific parser can be provided in the parser layer 104 for each supported language. In an implementation, a service adaptation description language (SADL) can be an XML-based language that describes mappings between data structures and attributes of business object nodes via XPath-like expressions. The mapping features within the SADL can include simple field mappings and enhanced mapping capabilities. Enhanced mapping capabilities can include, but are not limited to key-mapping. The SADL source can be passed to the BSA runtime layer 102 via the SADL parser 132.

To provide access to a SADL consumer runtime environment 110a, the SADL parser 132a can check the syntax of a SADL source and translate the SADL source into a format usable by the BSA compiler 114. In an implementation, the SADL parser 132a can provide an interface that validates the syntax of the SADL source. This interface can be used in design time tools to check the SADL source and to provide the SADL source to the SADL consumer runtime environment 110a. A generation step can also be triggered via the SADL consumer runtime environment 110a during runtime in the event that a consumer meta-data object has been changed, for example due to an upgrade of the system or some other event that causes change in a business object or its underlying data. The SADL source can be indicated via an UUID which can be defined in header data of a definition source.

In an alternative or additional implementation, a SQL dialect called Business Query Language (BQL) can be used to describe free-defined queries on business objects. One advantage of BQL is its easy to learn syntax. In combination with additional meta-data in the business object model to mark business object node attributes as searchable fields, BQL can provide a quick to learn and easy to use consumer interface for the application platform. A BQL parser 132*b* in the parser layer 104 can be used to translate a BQL statement to the format of the BSA compiler 114. The BQL parser 132*b* can also provide an interface to validate the syntax of the BQL statement. This interface can be used in design time tools to check the generated BQL string.

The BSA interpreter 116 of the BSA runtime layer 102 can be called by a SADL data access service 134*a*, a BQL data access service 134*b*, or another language data access service of the data access layer 106, for example using an object key of the runtime load 124. The BSA interpreter 116 can retrieve the runtime load 124 from the BSA load cache 120 and execute the necessary operations. This execution can either be done via the plug-ins 126 or via a local client proxy 128 depending on the execution strategy determined by the BSA compiler 114 during compilation. In case the query can be executed via a BOPF plug-in, the plug-in can execute an open SQL select statement on the underlying database tables. To improve speed and efficiency of execution of a request from the consumer runtime environment 110*a* or 110*b*, the BSA interpreter 116 can store results of a local client proxy call in the temporary runtime buffer 122 to prevent unnecessary duplicate calls. The BSA interpreter 116 can also integrate authority check capabilities on functional and instance levels as supported by a protocol, concept, or the like used by the back-end service adaptation system or other enterprise systems used by an organization or the like for authorization checks. One example of such a concept is Role-Based Access Management (RBAM), which is used in some systems available from SAP AG (Walldorf, Germany).

The consumer API or other consumer runtime environment 110*a* or 110*b* can provide the entry point for application developers to consume the framework. A service adaptation format according to an implementation of the current subject matter can comply with a different set of requirements for each of several consumers. One consumer can be a user interface which normally wants to retrieve only the data that is currently displayed on the screen. In such an example, the consumer runtime environment 110*a-b* (API) needs capabilities to load data on demand. Alternatively, in an "application To X users" (A2X) agent scenario, the complete data can be retrieved via one call. Data access services according to implementations of the current subject matter can separate data objects and data access services. Data access services 134*a-b* can provide an API to read data from business objects into a data source neutral object. The result of a data access service 134*a-b* can be a data object or a collection of data objects. In this manner, the framework can be more readily enhanced to deal with other data sources, such as for example business configuration data or the like. A data access service 134 can be provided to retrieve read-only data from a provider layer (for example a repository 112) via a BQL statement based on the BQL specification or via a SADL specification. Both data access services 134*a-b* can call the BSA interpreter 116 to provide the requested data. In addition, the consumer runtime environment 110*a-b* can also provide meta-data access to retrieve, such as for example user interface related information including but not limited to value help, label texts, or the like.

Figure 2:
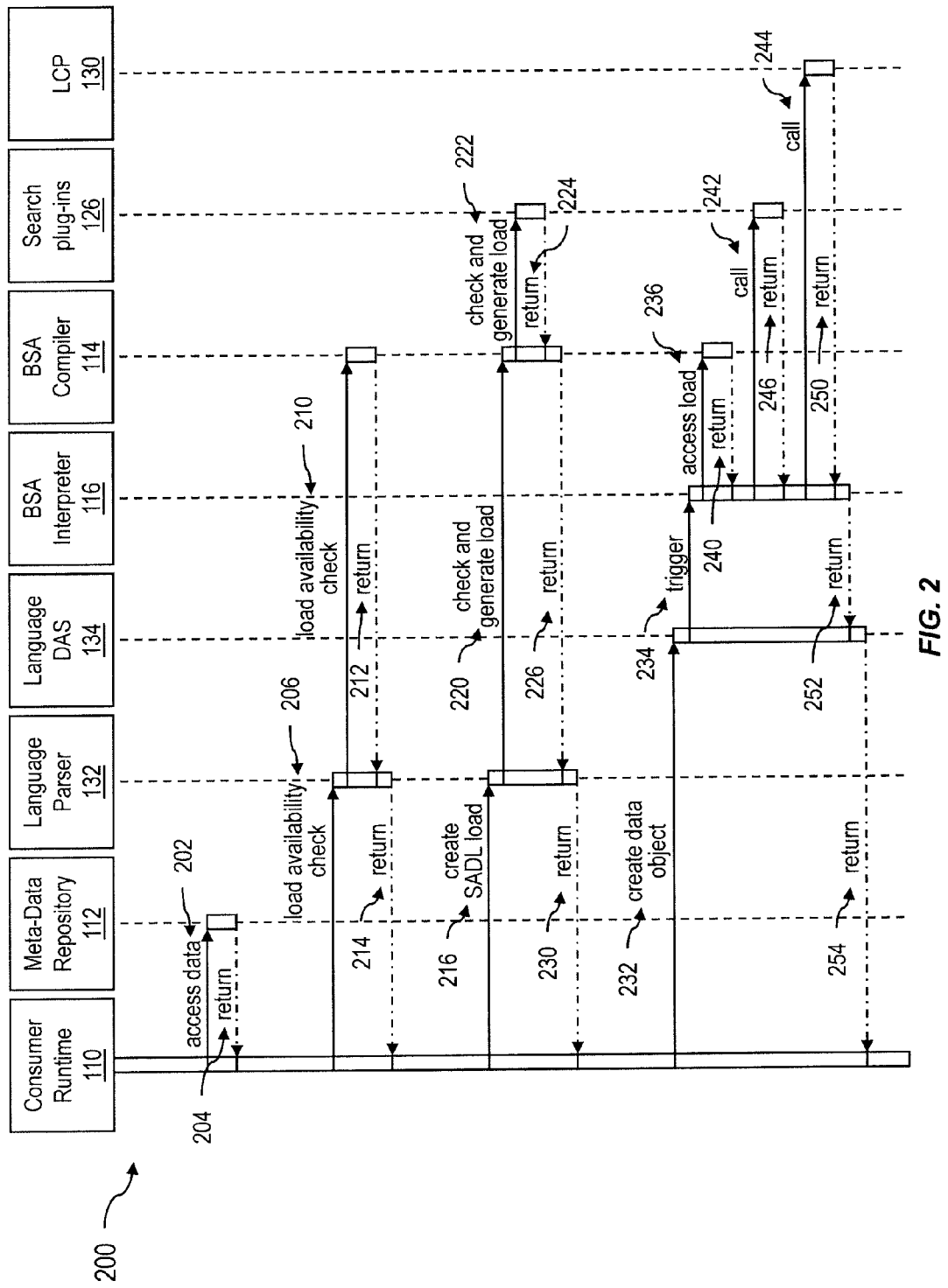
FIG. 2 is a diagram illustrating calls between components of a system.

The interaction of the above described system features will now be explained in additional detail in regards to an illustrative runtime scenario, for example in conjunction with a consumer runtime, such as for example a user interface (UI) runtime, an "application To X users" (A2X) runtime, or the like. FIG. 2 shows a sequence diagram 200 of an example runtime execution.

As shown in FIG. 2, after activation of a consumer runtime 110, which can be a SADL consumer runtime 110*a*, a BQL consumer runtime 110*b*, or a consumer runtime of another supported language, the consumer runtime 110 accesses runtime meta-data from a meta-data repository 112 at 202. The meta-data repository 112 returns the accessed meta-data at 204. The consumer runtime 110 extracts a key and forwards the key to a language parser 132 at 206 to check on the availability of a runtime load. The language parser 132 can be a SADL parser 132*a*, a BQL parser 132*b*, or another language parser. The language parser 132 relays this runtime load availability check to a back-end service adaptation compiler 114 at 210. The back-end service adaptation compiler 114 returns a status of the runtime load availability to the language parser 132 at 212 and in turn the language parser 132 returns the status to the consumer runtime 110 at 214.

If no load is available, for example because a load has not been previously generated, the consumer runtime 110 extracts a source code. The source code can be retrieved from a repository of the consumer runtime 110, or generated by the consumer runtime 110 based on other data in the repository at the consumer runtime 110. For example, a user interface runtime can generate a SADL from its UI model. The source code can be provided by the consumer runtime 110 in a language native to the consumer runtime 110. In one implementation, the source code is provided in SADL. In another implementation, SADL and other languages are supported by the back-end service adaptation system 100 by inclusion of a language-specific parser 132*b* in the parser layer 104 and a language-specific data access service 134*b* in the data access layer 106 corresponding to each service adaptation language that the back-end service adaptation system 100 supports.

The language parser 134 transforms the adaptation data received from the a consumer runtime 110 using the corresponding language into the internal, language-independent format used by the BSA compiler 114. In some implementations, the consumer runtime 110 can provide a mapping provider that implements a callback method called by the language parser 132 to access the source code document in the language of the SADL consumer runtime 110*a* document if the runtime load 124 is not available or if it is out of date. For other service adaptation languages, for example BQL, the source code can be directly given (since BQL is an ad-hoc scenario) without any callback mechanism. At 216, the consumer runtime 110 calls the language parser 132 with the source code to trigger generation of a runtime load 124. The language parser 132 checks the syntax of the source code, creates a compiler format of the adaptation meta-data, and calls the BSA compiler 114 at 220. The BSA compiler 114 can determine a runtime execution strategy with the assistance of one of more search plug-ins 126 at 222. Input from the search plug-ins 126 regarding the runtime execution strategy can be returned at 224 so that the BSA compiler 114 can generate a runtime load 124. The runtime load can be generated if necessary, but more or less independent of the consumer using the consumer runtime 110. If the consumer wishes to retrieve the data via the DAS 134*a* or 134*b*, the runtime load can contain the execution plan telling how to retrieve the data.

Once a runtime load 124 is available, the consumer runtime 110 initiates data retrieval via a language data access service (DAS) 134 at 232. The language DAS 134 can be a SADL DAS 134*a*, a BQL DAS 134*b*, or another language DAS. The language DAS 134 triggers a back-end service adaptation interpreter 116 at 234. At 236, the BSA interpreter 116 accesses the runtime load 124 from a cache at the BSA compiler 114, and the runtime load 126 is returned at 240. Depending on the runtime execution strategy, execution of the runtime load 124 can include one or more calls to the one or more search plug-ins 126 at 242 and/or to an LCP 128 at 244 with data returned to the BSA interpreter 116 at 246 and 250, respectively. The BSA interpreter 116, using the runtime load 124 and the returned data, creates one or more data objects that are returned at 252 to the language DAS 134. The one or more data objects are then delivered at 254 by the language DAS 134 to the consumer runtime 110.

Figure 3:
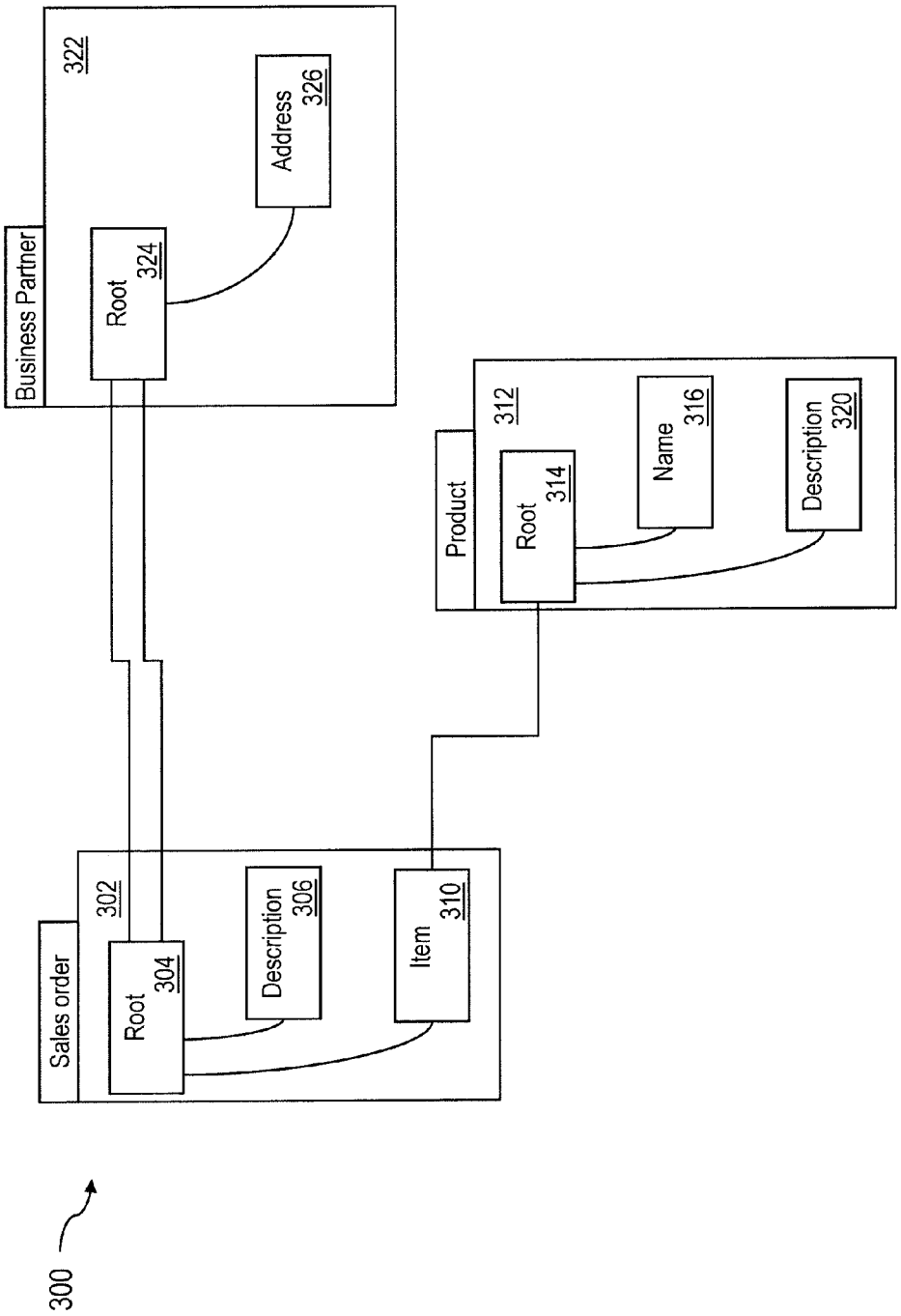
FIG. 3 is a block diagram showing calls between business objects in an example business process.

FIG. 3 shows a block diagram 300 of an example of a business object query that can be performed using the current subject matter. A sales order business object 302 can include a root node 304 as well as a description node 306 describing attributes of the sales order. An item node 310 can link to a product business object 312 that includes a root node 314 as well as a name node 316 and a description node 320 that describes describing attributes of the product. The sales order business object 302 can also link to a business partner business object 322 that includes its own root node 324 and an address node 326 describing attributes of a location of the business partner. During a sales order process implemented by an enterprise system, the sales order business object 302 can be accessed by a consumer runtime environment 110. The sales order business object 302 can in turn reference the business partner business object 322 and the product business object 312, which may not be directly usable to the consumer runtime environment. For example, one or more of the business objects 302, 312, 322 can be normalized for other business processes. One or more of the business objects 302, 312, 322 can also be provided by a meta-data repository of an external system that is not directly compatible with the consumer runtime environment 110. Service adaptation according to an implementation of the current subject matter can facilitate more efficient access to the data of the business objects 302, 312, 322.

Figure 4:
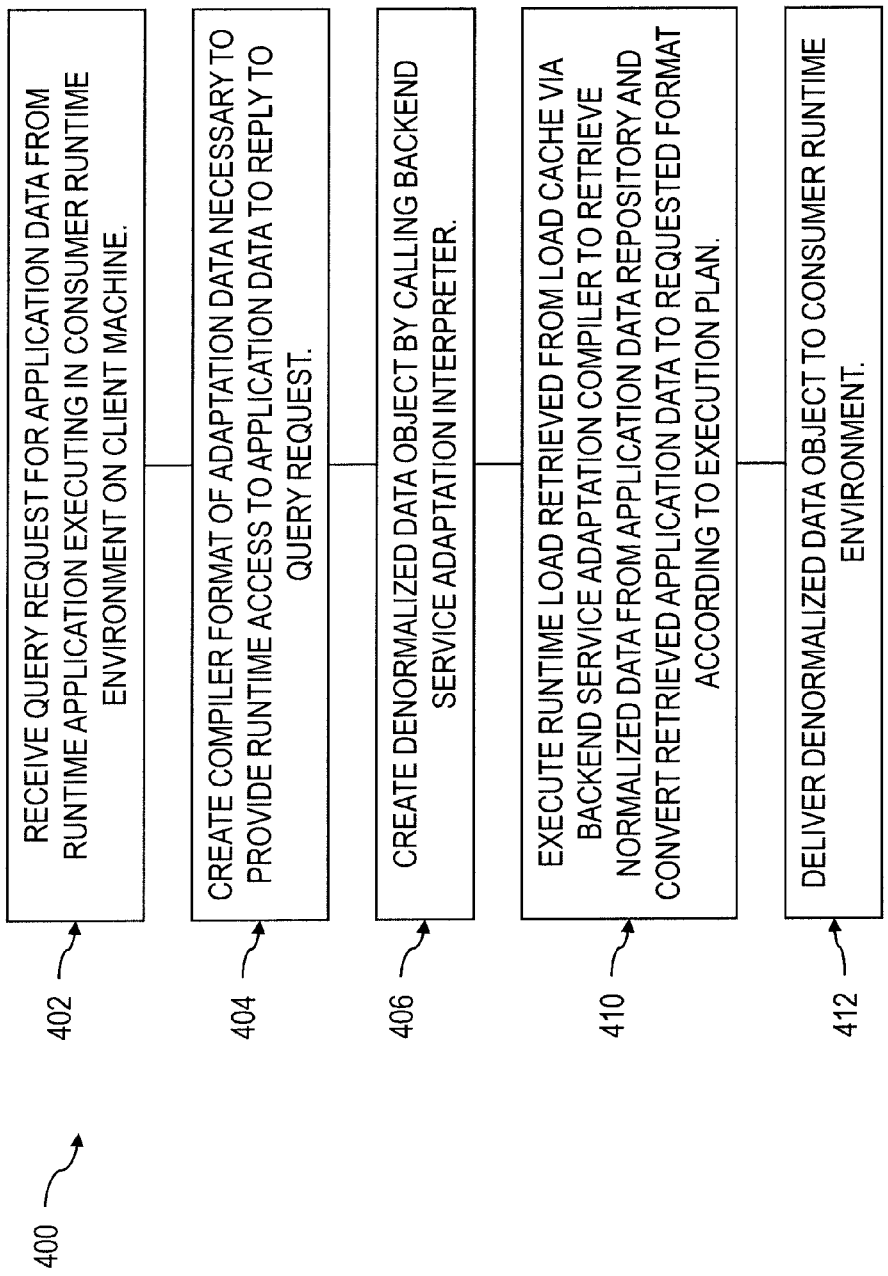
FIG. 4 is a process flow diagram illustrating a method according to an implementation.

In an implementation, a back-end service adaptation SADL XML source format can be used to provide one or more features and advantages of the current subject matter. The process flow diagram 400 of FIG. 4 illustrates a method for back-end service adaptation. At 402, a back-end service adaptation system implemented on at least one processor receives a query request from a runtime application executing in a consumer runtime environment 110A on a client machine. The consumer runtime environment uses SADL. The query request requests access via the consumer runtime environment 110*a* to application data, that can be normalized or denormalized, stored in a data repository 130. At 404, a SADL parser 132*a* of the back-end service adaptation system 100 creates a compiler format of adaptation data necessary to provide runtime access to the application data to reply to the query request. At 406, a data access service 134A of the back-end service adaptation system 100 creates a denormalized data object by calling the BSA interpreter 116. At 410, the BSA interpreter 116 executes a runtime load 124 retrieved from the load cache 120 via a BSA compiler 114. The runtime load 124 can contain an execution plan defining how the application data can be retrieved and a strategy indicating whether a local client proxy (LCP) 128, a search plug-in 126, or the like should be used in converting the data to a denormalized format for use by the SADL consumer runtime environment 110*a*. Execution of the execution plan of the runtime load 124 results in the back-end service adaptation system 100 retrieving the application data from one or more of the application data repositories 130 and converting the retrieved application data to the requested format according to the execution plan. The denormalized data object containing the retrieved and converted application data is delivered to the SADL consumer runtime environment 110*a* at 412.

Figure 5:
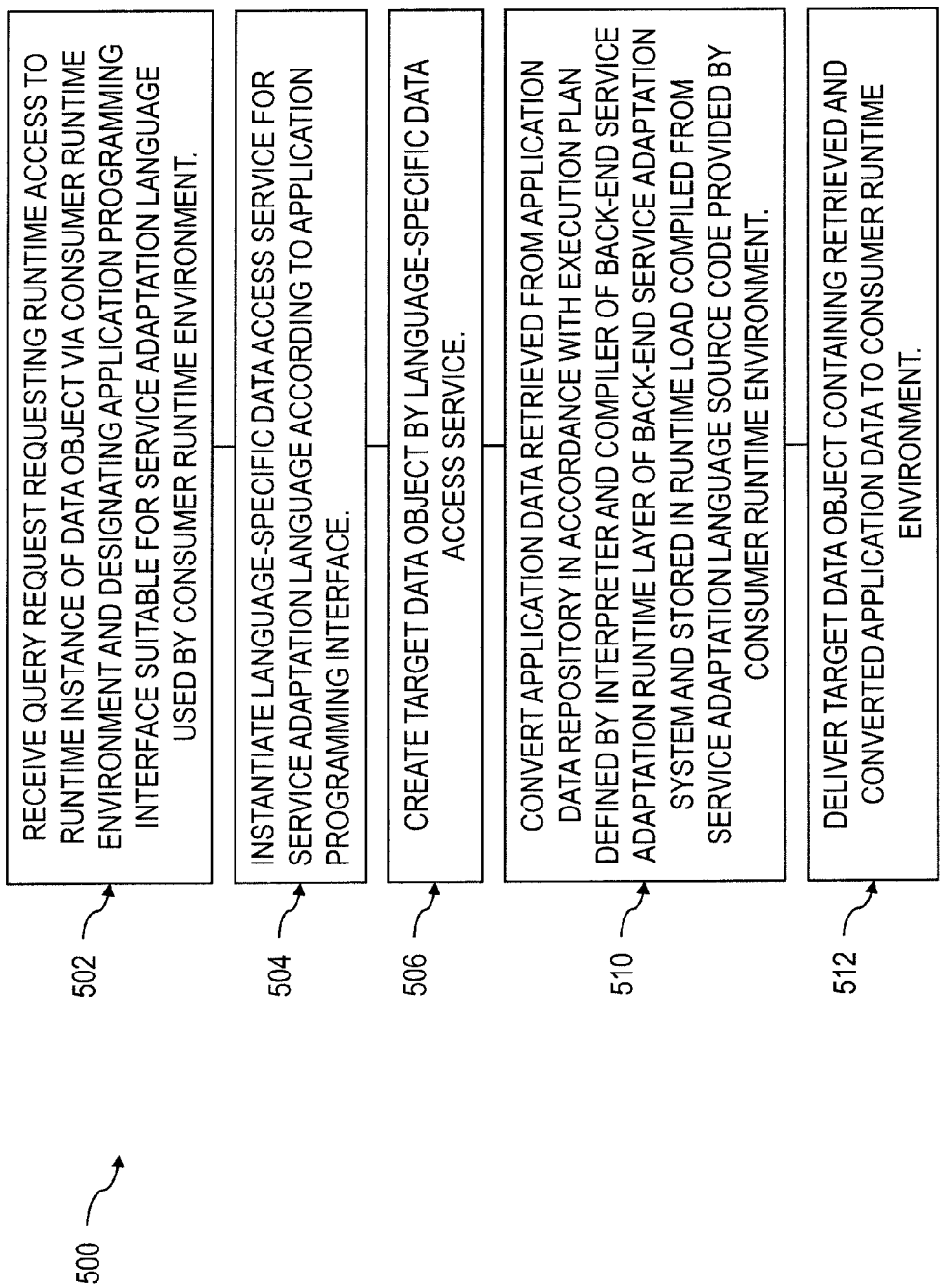
FIG. 5 is a process flow diagram illustrating a method according to an additional implementation.

In an additional implementation, a back-end service adaptation can be provided for an other consumer runtime environment 110*b* using an other service adaptation language as shown in the process flow chart 500 of FIG. 5. At 502, a back-end service adaptation system 100 that is implemented on at least one processor receives a query request from a runtime application executing in an other consumer runtime environment 110*b* on a client machine. The query request requests runtime access to a runtime instance of a data object via the consumer runtime environment 110*b*. The data object includes application data that are stored in an application repository 130. The query request designates an application programming interface suitable for a service adaptation language used by the other consumer runtime environment 110*b*. At 504, the back-end service adaptation system 100 instantiates an other language-specific data access service 134*b* for the service adaptation language according to the application programming interface. The other language-specific data access service 134*b* creates, at 506, a target data object to fulfill the request. At 510, the back-end service adaptation system 100 converts application data retrieved from the application data repository 130 in accordance with an execution plan defined by an interpreter 116 and a compiler 114 of a back-end service adaptation runtime layer 102 of the back-end service adaptation system 100. The execution plan is stored in a runtime load 124 compiled from a service adaptation language source code provided by the consumer runtime environment. The target data object containing the retrieved and converted application data is delivered to the consumer runtime environment at 512. An other language-specific parser 132*b* can be provided at a parser layer 104 of the back-end service adaptation system 100. The other language-specific parser 132*b* can create a compiler format of adaptation meta-data necessary to provide runtime access to the application data to reply to the query request. At 510, a language-specific data access service is instantiated in a data access service layer of the back-end service adaptation system.

An XML source format can be oriented on a standard such as XSD/XPath or the like. In an implementation, the Service Adaptation Description Language (SADL) is used. For this language, a namespace xmlns:sadl can be defined and used. A sadl:definition can also include other namespaces to avoid naming conflicts. The namespace of business objects for which service adaptation is to be provided can be an Enterprise Services Repository (ESR) namespace of the business objects. Namespaces with prefixes for associations, attributes, and other BO components can be used to facilitate distinguishing within a business object. For example, within a content of a binding attribute, an association name or attribute name (or other BO component) can occur. To avoid name clashes, such as associations and attributes having the same names within a business object node, a default namespace can be used the namespace for the business object attributes. User defined namespace prefixes can also be specified in a SADL XML document. An SADL parser 132a can check the uniqueness of the namespace prefixes. Therefore a sadl:definition can contain a sadl:dataSource where the type of the data source (for example, a business object), the binding (for example an entry path of the business object) and a name (which can be used as alias in an XML document), are specified.

In a sadl:definition, the sadl:resultSet can also be defined. The sadl:resultSet can contain a sadl:structure with the attributes and substructures. In a sadl:atttibute, the name of the attribute and the binding can be specified. The binding can contain, in a Xpath-like syntax, an access path for mapping to the business object data. For example, such an approach can provide either direct business object attribute access of the node as specified in the binding of the sadl:dataSource (for example using '/' for subcomponent access in the attribute type) or business object attribute access with sub path specification via business object associations (for example with a namespace prefix such as "assoc:" or "ass:" to denote an association) using '/' for the association links.

A sadl:definition can contain a list of XML namespace definitions, possibly including but not limited to the UUID of the SADL, the date and time of the SADL (CreateI-LastChange), one or more sadl:dataSource definitions, a list of sadl:callbacks (can be empty), and a sadl:resultSet. A sadl:dataSource can advantageously contain the data in some type. If the data source type is a business object node type, a binding can be defined. Especially when several data sources are specified, naming of the data source can be very helpful. The data source names can be used in the source definition as aliases to distinguish accesses to the different data sources. A sadl:callback can contain the programming language of the callback, the callback's class name, the names of the target business object type, the target node name, and the path ID of the callback. The callback can be used in any binding definition where an association can occur by specifying the callback name, for example with a prefix such as "clb:". Filtering by an association filter can also be provided. Filter expressions can be defined in brackets. In an implementation, an attribute binding can allow only one-to-one associations if a filter is not specified.

For a SADL consumer, the resulting structure need not necessarily be a structure specified in the result sadl:resultSet. Some consumers, such as for example an A2X service, a modeled agent, or the like, can prefer to pass a predefined type. In such an example, the resulting structure could also be an input of the data access service runtime for SADL. It can be advantageous for the resulting structure to be type compatible with the structure defined in the sadl:resultSet. A sadl:resultSet can be defined by a sadl:structure, that can have a name, a data source identifier, a binding and an explicit cardinality definition.

FIG. 6 shows an example source code 600 illustrating how a mapping with a result set having a deep structure can be defined. A table with a deep structure can include sub-tables. For example, one or more entry of one or several columns of the table can itself be a sub-table. Each sub-table can have its own deep structure. As an example, a table of sales orders can include a column that contains the items of the specific sales order. Each item can be described by its own sub-table, each of which can contain one or more schedule lines of the corresponding item. A sadl:resultSet can contain a structure not only with attributes, but also with sub structures. A sub structure can also be a sadl:structure with a name and binding. The binding can contain a linkage association for accessing the data of the attributes of the substructure. The cardinality of a sub structure can be by default derived from the cardinality of the BO meta-data, in other words, the cardinality of the association.

The sadl:structure can also contain a list with at least one attribute or substructure. The cardinality of the structure can be derived from the business object meta-data by default. A sadl:attribute can have a name and can have a binding or type and a behavior attribute definition. In the binding definition, the access paths are specified either to the attributes directly or via association paths, or a function call is specified. As noted above, association identifiers can be qualified with an association namespace prefix, for example "ass:" or "assoc.". In the binding of the data source definition, the path for the business object root can be used. If an association- or path-callback is used for the association path then a qualified path identifier, for example having a callback namespace prefix such as "clb:", can be defined.

A sadl:callback can be used for an association or a path callback. For example, traversing to a target business object and a target business object node can be implemented in an ABAP class. The sadl:callback definition can therefore contain a class name, a target business object, a target node and a name representing a path ID. To facilitate compatibility with other programming languages, the programming language of the callback can be defined in a type attribute of sadl:callback. The callback can be used in any structure and attribute binding definition where an association can occur, for example by specifying a callback name with a prefix such as "clb:". FIG. 7 shows an example of a source code 700 illustrating an implementation of sadl:callback.

FIG. 8 shows an example source code 800 illustrating a SADL extension that shows how obtaining a code description via a code name function can be supported. A general syntax for function calls in a binding attribute can be introduced. The binding attribute can contain a function call, whereby the function name can be qualified with a prefix, for example "fct:", and the arguments can be listed in "( . . . )" brackets. A first function call support in a back-end service adaptation runtime can be to obtain a code description. For the code description the code name function can be used. The function argument can be the path to the value of the code type.

Filtering via the login language used by the consumer runtime environment can also be provided. For example, as shown in the example source code 900 of FIG. 9, a variable, for example "SY-LANGU" can be used as the expression value in an association filter definition to support filtering by the login language for language-dependent attributes.

The attributes in a SADL result set can also contain a specification of a behavior attribute, for example one that determines whether attributes of the result are searchable. For example, an "is Searchable" behavior attribute can have the value "TRUE" to indicate that the sadl:attribute is used in a search condition or "FALSE" to indicate that the sadl:attribute is not used in a search condition. The "FALSE" value can be the default, to indicate that all attributes without explicit specification of the is Searchable attribute are not used in a search condition. In the example shown in the example source code 1000 shown in FIG. 10, a sadl:attribute "PRODUCT-NAME" is used for selection and is part of the result structure.

To be able to declare that an attribute is used in a search condition, but not part of the result structure, additionally an "is Output" behavior attribute with the value FALSE can be used. The "is Output" behavior attribute can have the value of "TRUE" to indicate that the sadl:attribute is part of the result set or "FALSE" to indicate that the sadl:attribute is not part of the result set. "TRUE" can be the default value. In an example, the "is Searchable" behavior attribute can be used to check whether a corresponding FSI query view contains the business object attribute. For example, for a sadl:attribute with the "is Searchable" value "TRUE", a FSI view containing the corresponding BO attribute can be mandatory, because such attribute is used in the selection parameters of a "free" query. If the FSI view is not available, the generation of the FSI view can be triggered by the SADL parser 132a during the query consumer runtime. The generation of a FSI view may be successful only when a search engine load for this attribute is already available. The search engine can in one example be the TREX search engine available from SAP AG (Walldorf, Germany). Otherwise, the SADL parser 132a can trigger an exception, return an error, or the like because the "free search" query could not be executed with good performance by using the fast search infrastructure (FSI).

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. Other implementations may be within the scope of the following claims.

The invention claimed is:

1. A computer-implemented method comprising:
receiving, at a service adaptation definition language-specific data access service of a back-end service adaptation system that is implemented on at least one processor, a query request in a service adaptation definition language (SADL) from a runtime application executing in a SADL consumer runtime environment on a client machine, the query request requesting runtime access to a runtime instance of a data object via the consumer runtime environment, the data object comprising application data that are stored in an application repository;
creating, by the service adaptation definition language-specific data access service, a denormalized data object;
executing, by an interpreter of the back-end service adaptation system, a runtime load that comprises an execution plan for retrieving and converting the normalized data, the runtime load having been compiled from a SADL source code provided by the SADL consumer runtime environment, the executing comprising retrieving the application data from the application repository and converting the application data for inclusion in the denormalized data object according to the execution plan;
calling, by the interpreter, at least one of a search plug-in and a local client proxy according to the execution plan of the runtime load, the at least one of the search plug-in and the local client proxy accessing the application data repository to retrieve the application data; and
delivering the denormalized data object containing the converted application data to the SADL consumer runtime environment.

2. A computer-implemented method as in claim 1, further comprising:
creating, by a SADL parser of the back-end service adaptation system from the source code in the service adaptation definition language, a compiler format of adaptation meta-data necessary to provide runtime access to the application data;

generating, by a compiler of the back-end service adaptation system using the compiler format, the runtime load, the generating comprising calling, by the compiler, at least one search plug-in to determine the execution plan to provide optimal performance in response to the query request;

storing, by the compiler, the runtime load in a load cache; and accessing, by the interpreter, the runtime load from the load cache via the compiler.

3. A computer-implemented method as in claim 1, further comprising: verifying a proper syntax of the query request by an SADL parser of the backend service adaptation system.

4. A computer-implemented method as in claim 1, further comprising: performing a load availability check to determine whether the runtime load has been previously generated and is up to date.

5. A computer-implemented method as in claim 4, wherein if the load availability check determines that the runtime load has been not previously generated or is not up to date, the method further comprises:

receiving the SADL source code from the SADL consumer runtime environment; and calling the SADL parser to trigger generation of the runtime load from the SADL source code by a compiler of the back-end service adaptation system.

6. A computer-implemented method as in claim 5, further comprising: the SADL parser translating the SADL source code into a language-independent format usable by the compiler.

7. A computer-readable storage medium storing instructions that, when executed by at least one processor, cause the at least one processor to perform operations comprising:

receiving, at a service adaptation definition language-specific data access service of a back-end service adaptation system that is implemented on at least one processor, a query request in a service adaptation definition language (SADL) from a runtime application executing in a SADL consumer runtime environment on a client machine, the query request requesting runtime access to a runtime instance of a data object via the consumer runtime environment, the data object comprising application data that are stored in an application repository;

creating, by the service adaptation definition language-specific data access service, a denormalized data object;

executing, by an interpreter of the back-end service adaptation system, a runtime load that comprises an execution plan for retrieving and converting the normalized data, the runtime load having been compiled from a SADL source code provided by the SADL consumer runtime environment, the executing comprising retrieving the application data from the application repository and converting the application data for inclusion in the denormalized data object according to the execution plan;

wherein the operations further comprise: calling, by the interpreter, at least one of a search plug-in and a local client proxy according to the execution plan of the runtime load, the at least one of the search plug-in and the local client proxy accesses the application data repository to retrieve the application data; and delivering the denormalized data object containing the converted application data to the SADL consumer runtime environment.

8. A computer-readable storage medium as in claim 7, wherein the operations further comprise:

creating, by a SADL parser of the back-end service adaptation system from the source code in the service adaptation definition language, a compiler format of adaptation meta-data necessary to provide runtime access to the application data;

generating, by a compiler of the back-end service adaptation system using the compiler format, the runtime load, the generating comprising calling, by the compiler, at least one search plug-in to determine the execution plan to provide optimal performance in response to the query request;

storing, by the compiler, the runtime load in a load cache; and accessing, by the interpreter, the runtime load from the load cache via the compiler.

9. A computer-readable storage medium as in claim 7, wherein the operations further comprise: verifying a proper syntax of the query request by an SADL parser of the backend service adaptation system.

10. A computer-readable storage medium as in claim 7, wherein the operations further comprise: performing a load availability check to determine whether the runtime load has been previously generated and is up to date.

11. A computer-readable storage medium as in claim 10, wherein if the load availability check determines that the runtime load has been not previously generated or is not up to date, the method further comprises:

receiving the SADL source code from the SADL consumer runtime environment; and calling the SADL parser to trigger generation of the runtime load from the SADL source code by a compiler of the back-end service adaptation system.

12. A computer-readable storage medium as in claim 11, further comprising: the SADL parser translating the SADL source code into a language-independent format usable by the compiler.

13. A system comprising: at least one processor; and at least one memory storing instructions that cause the at least one processor to perform operations comprising:

receiving, at a service adaptation definition language-specific data access service of a back-end service adaptation system that is implemented on at least one processor, a query request in a service adaptation definition language (SADL) from a runtime application executing in a SADL consumer runtime environment on a client machine, the query request requesting runtime access to a runtime instance of a data object via the consumer runtime environment, the data object comprising application data that are stored in an application repository;

creating, by the service adaptation definition language-specific data access service, a denormalized data object;

executing, by an interpreter of the back-end service adaptation system, a runtime load that comprises an execution plan for retrieving and converting the normalized data, the runtime load having been compiled from a SADL source code provided by the SADL consumer runtime environment, the executing comprising retrieving the application data from the application repository and converting the application data for inclusion in the denormalized data object according to the execution plan;

calling, by the interpreter, at least one of a search plug-in and a local client proxy according to the execution plan of the runtime load, the at least one of the search plug-in and the local client proxy accesses the application data repository to retrieve the application data; and delivering the denormalized data object containing the converted application data to the SADL consumer runtime environment.

14. A system as in claim 13, wherein the operation further comprise:

creating, by a SADL parser of the back-end service adaptation system from the source code in the service adaptation definition language, a compiler format of adaptation meta-data necessary to provide runtime access to the application data;

generating, by a compiler of the back-end service adaptation system using the compiler format, the runtime load, the generating comprising calling, by the compiler, at least one search plug-in to determine the execution plan to provide optimal performance in response to the query request;

storing, by the compiler, the runtime load in a load cache; and accessing, by the interpreter, the runtime load from the load cache via the compiler.

15. A system as in claim 13, wherein the operation further comprise: verifying a proper syntax of the query request by an SADL parser of the backend service adaptation system.

16. A system as in claim 13, wherein the operation further comprise: performing a load availability check to determine whether the runtime load has been previously generated and is up to date.

17. A system as in claim 16, wherein if the load availability check determines that the runtime load has been not previously generated or is not up to date, the method further comprises:

receiving the SADL source code from the SADL consumer runtime environment; and calling the SADL parser to trigger generation of the runtime load from the SADL source code by a compiler of the back-end service adaptation system.

* * * * *